(12) United States Patent
Morin et al.

(10) Patent No.: US 8,246,292 B1
(45) Date of Patent: Aug. 21, 2012

(54) LOW NOISE TURBINE FOR GEARED TURBOFAN ENGINE

(75) Inventors: Bruce L. Morin, Springfield, MA (US); Detlef Korte, Munich (DE)

(73) Assignees: United Technologies Corporation, Hartford, CT (US); MTU Aero Engines GmbH, Munich (DE)

( * ) Notice: Subject to any disclaimer, the term of this patent is extended or adjusted under 35 U.S.C. 154(b) by 0 days.

(21) Appl. No.: 13/403,005

(22) Filed: Feb. 23, 2012

Related U.S. Application Data

(60) Provisional application No. 61/592,643, filed on Jan. 31, 2012.

(51) Int. Cl.
*F01D 1/02* (2006.01)

(52) U.S. Cl. ......... 415/1; 415/119; 415/181; 415/198.1; 415/199.4; 416/1; 416/500; 416/DIG. 2

(58) Field of Classification Search .............. 415/1, 119, 415/181, 198.1, 199.4; 416/1, 500, DIG. 2
See application file for complete search history.

(56) References Cited

U.S. PATENT DOCUMENTS

| | | | | |
|---|---|---|---|---|
| 3,270,953 | A | * | 9/1966 | Jerie et al. ..................... 415/119 |
| 3,747,343 | A | * | 7/1973 | Rosen ........................... 415/119 |
| 3,953,148 | A | | 4/1976 | Seippel et al. |
| 4,883,240 | A | * | 11/1989 | Adamson et al. ............. 415/119 |
| 4,968,216 | A | * | 11/1990 | Anderson et al. .......... 415/199.5 |
| 5,169,288 | A | | 12/1992 | Gliebe et al. |
| 5,486,091 | A | | 1/1996 | Sharma |
| 6,036,438 | A | | 3/2000 | Imai |
| 6,195,983 | B1 | | 3/2001 | Wadia et al. |
| 6,260,794 | B1 | | 7/2001 | Rowe |
| 6,554,564 | B1 | | 4/2003 | Lord |
| 7,108,485 | B2 | | 9/2006 | Wobben |
| 7,694,505 | B2 | | 4/2010 | Schilling |
| 7,806,651 | B2 | | 10/2010 | Kennepohl et al. |
| 7,976,283 | B2 | | 7/2011 | Huck |
| 7,984,607 | B2 | | 7/2011 | Sharma et al. |

OTHER PUBLICATIONS

Jane's Aero-Engines, Issue Seven, Copyright 2000, pp. 510-512.

* cited by examiner

*Primary Examiner* — Igor Kershteyn

(74) *Attorney, Agent, or Firm* — Carlson, Gaskey & Olds, PC

(57) ABSTRACT

A gas turbine engine is utilized in combination with a gear reduction to reduce the speed of a fan relative to a low pressure turbine speed. The gas turbine engine is designed such that a blade count in the low pressure turbine multiplied by the speed of the low pressure turbine will result in operational noise that is above a sensitive range for human hearing. A method and turbine module are also disclosed.

20 Claims, 1 Drawing Sheet

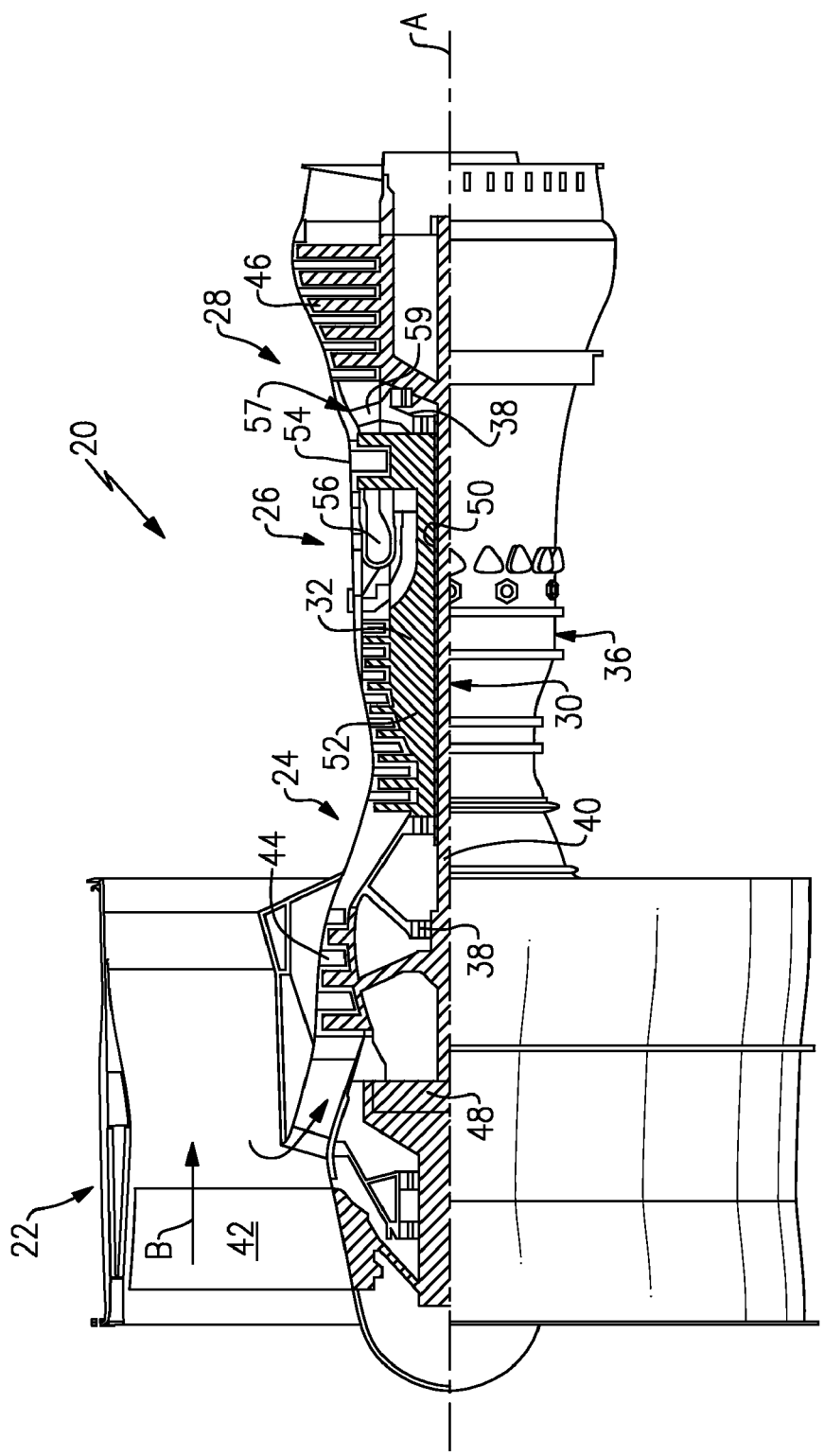

LOW NOISE TURBINE FOR GEARED TURBOFAN ENGINE

CROSS-REFERENCE TO RELATED APPLICATION

This application claims priority to U.S. Provisional Application No. 61/592,643, which was filed Jan. 31, 2012.

BACKGROUND

This application relates to the design of a turbine which can be operated to produce noise that is less sensitive to human hearing.

Gas turbine engines are known, and typically include a fan delivering air into a compressor. The air is compressed in the compressor and delivered downstream into a combustor section where it was mixed with fuel and ignited. Products of this combustion pass downstream over turbine rotors, driving the turbine rotors to rotate.

Typically, there is a high pressure turbine rotor, and a low pressure turbine rotor. Each of the turbine rotors include a number of rows of turbine blades which rotate with the rotor. Interspersed between the rows of turbine blades are vanes.

The low pressure turbine can be a significant noise source, as noise is produced by fluid dynamic interaction between the blade rows and the vane rows. These interactions produce tones at a blade passage frequency of each of the low pressure turbine stages, and their harmonics.

The noise can often be in a frequency range that is very sensitive to humans. To mitigate this problem, in the past, a vane-to-blade ratio has been controlled to be above a certain number. As an example, a vane-to-blade ratio may be selected to be 1.5 or greater, to prevent a fundamental blade passage tone from propagating to the far field. This is known as "cut-off."

However, acoustically cut-off designs may come at the expense of increased weight and reduced aerodynamic efficiency. Stated another way, by limiting the designer to a particular vane to blade ratio, the designer may be restricted from selecting such a ratio based upon other characteristics of the intended engine.

Historically, the low pressure turbine has driven both a low pressure compressor section and a fan section. More recently, a gear reduction has been provided such that the fan and low pressure compressor can be driven at distinct speeds.

SUMMARY OF THE INVENTION

In a featured embodiment, a gas turbine engine has a fan, a compressor section including a low pressure compressor and a high pressure compressor, a combustor section, a high pressure turbine and a low pressure turbine. The low pressure turbine drives the low pressure compressor and fan. A gear reduction is utilized to reduce the speed of the fan from an input speed from the low pressure turbine. The low pressure turbine has a number of turbine blades in each of a plurality of rows of the turbine. The low pressure turbine blades operate at a rotational speed. The number of blades and the rotational speed are selected such that the following formula holds true for at least one of the blade rows of the low pressure turbine: (number of blades×speed)/60≧5500. The rotational speed is an approach speed in revolutions per minute.

In another embodiment according to the foregoing embodiment, the formula results in a number greater than or equal to 6000.

In another embodiment according to the foregoing embodiment, the gas turbine engine is rated to produce 15,000 pounds of thrust or more.

In another embodiment according to the immediately foregoing embodiment, the formula holds true for the majority of the blade rows of the low pressure turbine.

In another embodiment according to the immediately foregoing embodiment, the formula holds true for all of the blade rows of the low pressure turbine.

In another embodiment according to the featured embodiment, the formula holds true for the majority of the blade rows of the low pressure turbine.

In another embodiment according to the featured embodiment, the formula holds true for all of the blade rows of the low pressure turbine.

In another featured embodiment, a method of designing a gas turbine engine includes the steps of including a gear reduction between a low pressure turbine and a fan, and selecting the number of blades of the low pressure turbine rotors, in combination with the rotational speed of the low pressure turbine, such that the following formula holds true for at least one of the blade rows of the low pressure turbine: (number of blades×speed)/60≧5500. The rotational speed is an approach speed in revolutions per minute.

In another embodiment according to the foregoing embodiment, the formula results in a number greater than or equal to 6000.

In another embodiment according to the foregoing embodiment, the gas turbine engine is rated to produce 15,000 pounds of thrust or more.

In another embodiment according to the immediately foregoing embodiment, the formula holds true for the majority of the blade rows of the low pressure turbine.

In another embodiment according to the immediately foregoing embodiment, the formula holds true for all of the blade rows of the low pressure turbine.

In another embodiment according to the featured embodiment, the formula holds true for the majority of the blade rows of the low pressure turbine.

In another embodiment according to the immediately foregoing embodiment, the formula holds true for all of the blade rows of the low pressure turbine.

In another featured embodiment, a turbine module for a gas turbine engine has a low pressure turbine with a number of turbine blades in each of a plurality of rows of the turbine. The low pressure turbine blades operate at a rotational speed. The number of blades and the rotational speed are selected such that the following formula holds true for at least one of the blade rows of the low pressure turbine: (number of blades× speed)/60≧5500. The rotational speed is an approach speed in revolutions per minute.

In another embodiment according to the foregoing embodiment, the formula results in a number greater than or equal to 6000.

In another embodiment according to the foregoing embodiment, the gas turbine engine is rated to produce 15,000 pounds of thrust or more.

In another embodiment according to the immediately foregoing embodiment, the formula holds true for the majority of the blade rows of the low pressure turbine.

In another embodiment according to the immediately foregoing embodiment, the formula holds true for all of the blade rows of the low pressure turbine.

In another embodiment according to the featured embodiment, the formula holds true for the majority of the blade rows of the low pressure turbine.

In another embodiment according to the featured embodiment, the formula holds true for all of the blade rows of the low pressure turbine. These and other features of the invention would be better understood from the following specifications and drawings, the following of which is a brief description.

BRIEF DESCRIPTION OF THE DRAWINGS

FIG. 1 shows a gas turbine engine.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown), or an intermediate spool, among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The terms "low" and "high" as applied to speed or pressure for the spools, compressors and turbines are of course relative to each other. That is, the low speed spool operates at a lower speed than the high speed spool, and the low pressure sections operate at lower pressure than the high pressures sections.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

The use of the gear reduction between the low pressure turbine spool and the fan allows an increase of speed to the low pressure compressor. In the past, the speed of the low pressure turbine has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the low pressure turbine speed caused by a desire to not have unduly high fan speeds.

It has been discovered that a careful design between the number of rotating blades, and the rotational speed of the low pressure turbine can be selected to result in noise frequencies that are less sensitive to human hearing.

A formula has been developed as follows:

$$(\text{blade count} \times \text{rotational speed})/60 \geq 5500.$$

That is, the number of rotating blades in any low pressure turbine stage, multiplied by the rotational speed of the low pressure turbine (in revolutions per minute), divided by 60 should be greater than or equal to 5500. More narrowly, the amount should be above 6000.

The operational speed of the low pressure turbine as utilized in the formula should correspond to the engine operating conditions at each noise certification point defined in Part 36 or the Federal Airworthiness Regulations. More particularly, the rotational speed may be taken as an approach certification point as defined in Part 36 of the Federal Airworthiness Regulations. For purposes of this application and its claims, the term "approach speed" equates to this certification point.

It is envisioned that all of the rows in the low pressure turbine meet the above formula. However, this application may also extend to low pressure turbines wherein the majority of the blade rows in the low pressure turbine meet the above formula, but perhaps some may not.

This will result in operational noise that would be less sensitive to human hearing.

In embodiments, it may be that the formula can result in a range of greater than or equal to 5500, and moving higher. Thus, by carefully designing the number of blades and controlling the operational speed of the low pressure turbine (and a worker of ordinary skill in the art would recognize how to control this speed) one can assure that the noise frequencies produced by the low pressure turbine are of less concern to humans.

This invention is most applicable to jet engines rated to produce 15,000 pounds of thrust or more. In this thrust range, prior art jet engines have typically had frequency ranges of about 4000 hertz. Thus, the noise problems as mentioned above have existed.

Lower thrust engines (<15,000 pounds) may have operated under conditions that sometimes passed above the 4000 number, and even approached 6000, however, this has not been in combination with the geared architecture, nor in the higher powered engines which have the larger fans, and thus the greater limitations on low pressure turbine speed.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan, a compressor section including a compressor having a low pressure portion and a high pressure portion, a combustor section, and a turbine having a low pressure portion; a gear reduction effecting a reduction in the speed of said fan relative to an input speed to said fan; said low pressure portion of said turbine having a number of turbine blades in each of a plurality of rows of said turbine portion, and said low pressure turbine blades operating at least some of the time at a rotational speed, and said number of blades and said rotational speed being such that the following formula holds true for at least one of the blade rows of the low pressure turbine (number of blades×speed)/60≧5500; and said rotational speed being an approach speed in revolutions per minute.

2. The gas turbine engine as set forth in claim 1, wherein the formula results in a number greater than or equal to 6000.

3. The gas turbine engine as set forth in claim 2, wherein said gas turbine engine is rated to produce 15,000 pounds of thrust or more.

4. The gas turbine engine as set forth in claim 3, wherein the formula holds true for the majority of blade rows of the low pressure turbine.

5. The gas turbine engine as set forth in claim 4, wherein the formula holds true for all of the blade rows of the low pressure turbine.

6. The gas turbine engine as set forth in claim 1, wherein the formula holds true for the majority of the blade rows of the low pressure turbine.

7. The gas turbine engine as set forth in claim 6, wherein the formula holds true for all of the blade rows of the low pressure turbine.

8. A method of designing a gas turbine engine comprising the steps of including a gear reduction between a low pressure turbine portion and a fan, and selecting the number of blades in each row of the low pressure turbine portion rotors, in combination with the rotational speed of the low pressure turbine, such that the following formula holds true for at least one of the blade rows of the low pressure turbine:

(number of blades×speed)/60≧5500; and said rotational speed being an approach speed in revolutions per minute.

9. The method of designing a gas turbine engine as set forth in claim 8, wherein the formula results in a number greater than or equal to 6000.

10. The method of designing a gas turbine engine as set forth in claim 9, wherein said gas turbine engine is rated to produce 15,000 pounds of thrust or more.

11. The method as set forth in claim 10, wherein the formula holds true for the majority of the blade rows of the low pressure turbine.

12. The method as set forth in claim 11, wherein the formula holds true for all of the blade rows of the low pressure turbine.

13. The method as set forth in claim 8, wherein the formula holds true for the majority of the blade rows of the low pressure turbine.

14. The method as set forth in claim 13, wherein the formula holds true for all of the blade rows of the low pressure turbine.

15. A turbine module comprising:
a low pressure turbine portion having a number of turbine blades in each of a plurality of rows of said low pressure turbine portion, and said low pressure turbine portion operating at least some of the time at a rotational speed, and said number of blades and said rotational speed being such that the following formula holds true for at least one of the blade rows of the low pressure turbine portion (number of blades×speed)/60≧5500; and said rotational speed being an approach speed in revolutions per minute.

16. The turbine module as set forth in claim 15, wherein the formula results in a number greater than or equal to 6000.

17. The turbine module as set forth in claim 16, wherein said gas turbine engine is rated to produce 15,000 pounds of thrust or more.

18. The turbine module as set forth in claim 17, wherein the formula holds true for the majority of blade rows of the low pressure turbine.

19. The turbine module as set forth in claim 18, wherein the formula holds true for all of the blade rows of the low pressure turbine.

20. The turbine module as set forth in claim 15, wherein the formula holds true for the majority of the blade rows of the low pressure turbine.

* * * * *